United States Patent [19]
Albrecht et al.

[11] Patent Number: 5,098,146
[45] Date of Patent: Mar. 24, 1992

[54] MOVABLE FLOOR FOR A PICKUP TRUCK

[76] Inventors: Helmut Albrecht, 5478 Grafton Rd., Valley City, Ohio 44280; John Fabing, 3528 SE. 17th Pl., Cape Coral, Fla. 33904

[21] Appl. No.: 669,484

[22] Filed: Mar. 14, 1991

[51] Int. Cl.⁵ .................................... B60P 1/52
[52] U.S. Cl. ............................. 296/26; 108/44
[58] Field of Search ............... 296/26; 414/522; 108/44, 137, 160

[56]  References Cited
U.S. PATENT DOCUMENTS

| | | | |
|---|---|---|---|
| 2,284,419 | 5/1942 | Greig | 296/26 |
| 2,391,310 | 12/1945 | Heller | 414/522 X |
| 2,471,730 | 5/1949 | Doerr | 108/44 X |
| 3,132,755 | 5/1964 | Greenslate | 414/522 |
| 3,471,045 | 10/1969 | Panciocco | 414/522 |
| 3,768,673 | 10/1973 | Nydam et al. | 296/26 X |
| 4,199,188 | 4/1980 | Albrecht et al. | 296/100 |
| 4,915,437 | 4/1990 | Cherry | 108/44 X |
| 4,993,088 | 2/1991 | Chudik | 296/26 X |

FOREIGN PATENT DOCUMENTS 2139982  11/1984  United Kingdom ............. 414/522

Primary Examiner—Dennis H. Pedder
Attorney, Agent, or Firm—J. Helen Slough

[57] ABSTRACT

This invention is a sliding floor for utility vehicles. The sliding floor consists of longitudinally C-shaped channels disposed at either side of the truck bed and extending parallel to each other. A sliding plate adapted for lengthwise movement to and fro over the floor of the truck is mounted for movement dictated by the channel mounting and acting as race ways for the sliding plate. The sliding plate rests upon rollers interposed between the C-shaped channels which permits the sliding plate to be easily moved inwardly and outwardly of the truck bed. At the back of the sliding floor, stop means are provided to prevent the sliding plate from moving beyond a designated end of the truck bed. A lock is preferably provided that locks the sliding plate in several extended positions. Also support legs are provided to provide surface support for the floor, if desired, when the floor is extended.

10 Claims, 5 Drawing Sheets

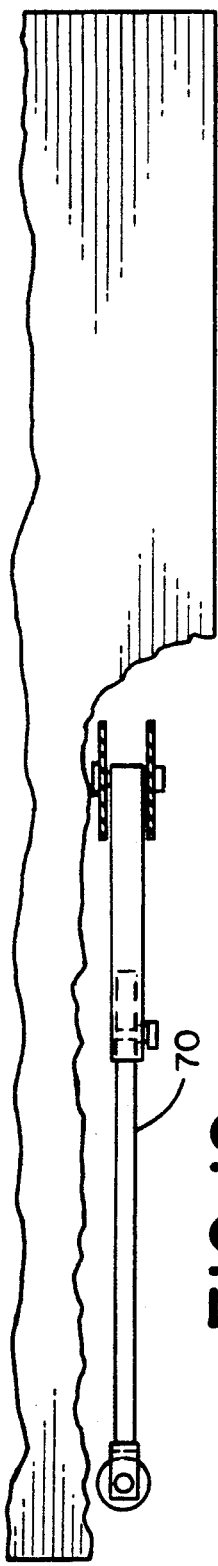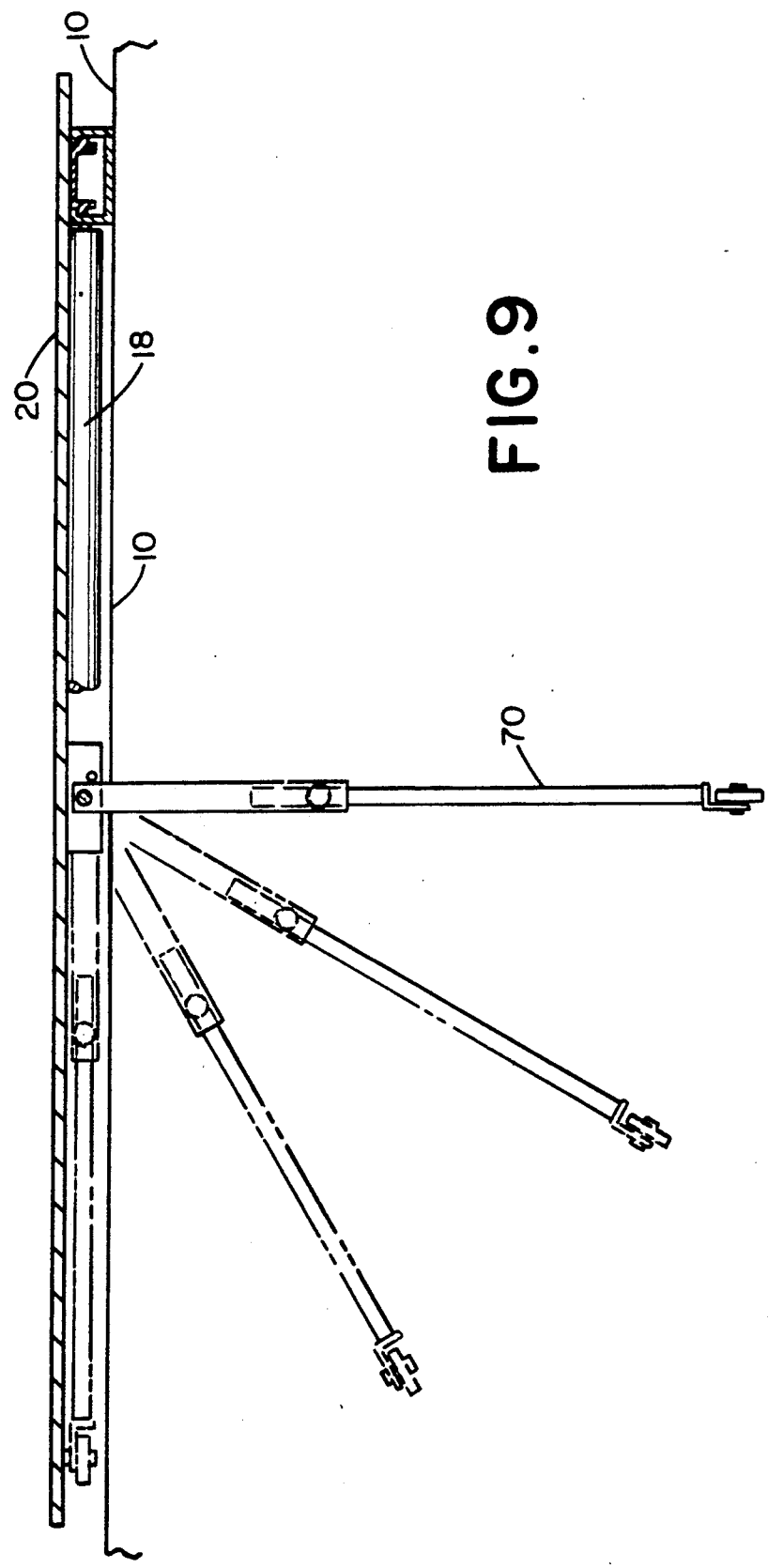

MOVABLE FLOOR FOR A PICKUP TRUCK

FIELD OF THE INVENTION

The invention relates to a movable floor for a pickup truck bed or van.

BACKGROUND OF THE INVENTION

Pickup trucks are vehicles designed for carrying small to medium size loads in open beds which are located behind the cab of the truck. The beds are normally provided with vertically disposed side panels. "Caps" are commonly used for covering the pickup truck bed which enclose the pickup truck bed to enable the use thereof as "campers". Typically such "caps" are installed on the bed for extended periods of time. Mounting of the same over a truck bed commonly however presents difficulties in loading and unloading the pickup truck bed and necessitating an individual desiring to load or unload to reach or crawl under such caps in order to retrieve objects or material stored in the pickup truck bed covered by the cap.

One solution for solving the problems hereinbefore referred to which has been suggested lies in providing a movable tool bed, as shown in U.S. Pat. No. 4,705,315 to Cherry. While this appears a suitable solution for removing relatively smaller items such as tools stored in the truck, it is not an acceptable solution for removing larger loads.

Telescoping or Sliding Units have been used, as shown in U.S. Pat. Nos. 2,852,303 to Hopson, 4,681,360 to Peters et al, and 4,909,558 to Roshinsky which sliding units can be pulled out by an individual unloading the truck. Once a portion of the truck body extension in such structures is extended beyond the truck body, material and objects carried on the extended body can be unloaded from the floor extension without being hampered by a cap on the pickup or by the sides of the pickup. The extension means in such prior structures have been found to be complicated, expensive in manufacture and present difficulties in use. Such structures also have been found difficult to install.

It is a principal object of the present invention to provide a sliding or movable floor for the truck bed which is inexpensive in manufacture and highly efficient in use. It is further an object of this invention to produce a floor which can be easily and quickly installed within a pickup truck.

SUMMARY OF THE INVENTION

The invention relates to a slidable floor for the truck bed of a utility vehicle and said floor is especially designed for use in "pickup" trucks and for trucks having a "cap" over the same and providing means for extending the bed or portion of said slidable floor beyond the truck bed area and beyond the "cap" covered area of the bed of the truck or the bed thereof so that the bed of the truck can be readily loaded or unloaded and easily moved from original seating within the bed of the truck to a position wherein a substantial portion of the same can be extended beyond the bed of the truck position beyond a position of the bed and later readily moved back into its original seated position. The sliding floor is attached to the bed or floor of the pickup truck and adapted to ride within longitudinally extending C-shaped channels mounted on either side of the truck bed and extending parallel to each other. The extension floor is provided with a sliding plate adapted for longitudinal lengthwise movement over the floor or bed of the truck. In the preferred form of the invention spaced rails are secured on the underside of the slidable floor which are adapted to interlock in C-shaped channels secured to the bottom floor or bed of the truck. Interposed between the C-shaped channels the plate rides on roller means which permit the sliding plate to be easily rolled inwardly and outwardly on the bed of the truck. Stops are provided to prevent the entire sliding plate from moving beyond the end of the truck and a stop or lock is provided at the inner end of the sliding plate end to securely retain the entire sliding plate within the truck bed as desired. Stops or locks are also provided so that the plate can be extended beyond the bed truck at various lengths. Also when the secured plate is extended outwardly from the bed of the truck means are provided for supporting the extended plate if necessary. In one form the said means utilizes a foldable leg adjustable in length is adapted to be carried on the underside of the plate and to be disposed in contact with ground surfaces beneath the extended plate and beyond the end of the truck.

BRIEF DESCRIPTION OF THE DRAWINGS

FIG. 9 is a perspective view of the folded leg of the invention; and

FIG. 10 shows the folded leg of the invention in phantom in its storage position.

DETAILED DESCRIPTION OF THE PREFERRED EMBODIMENT

Figure 1:
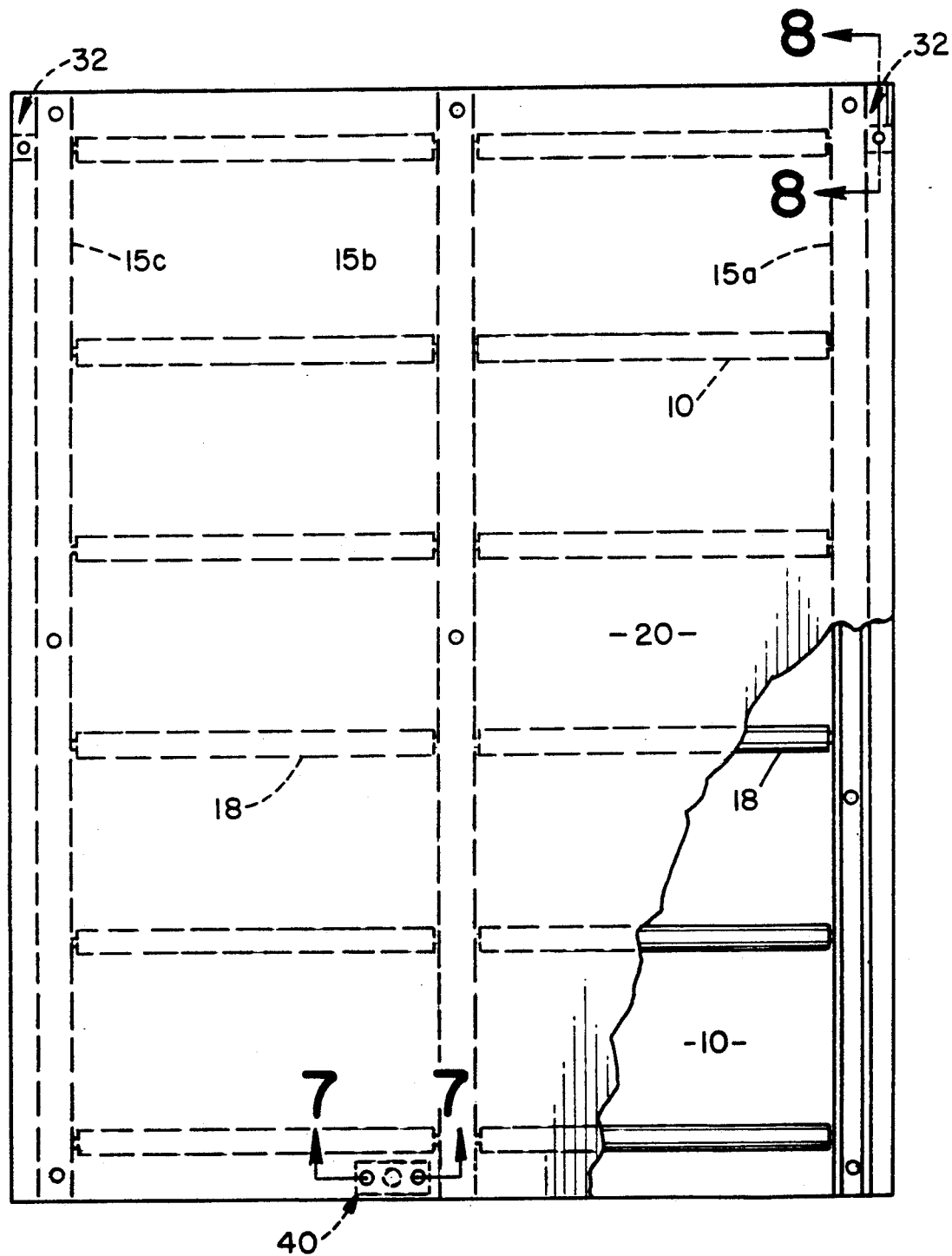
FIG. 1 is a top view of the invention.
Figure 2:
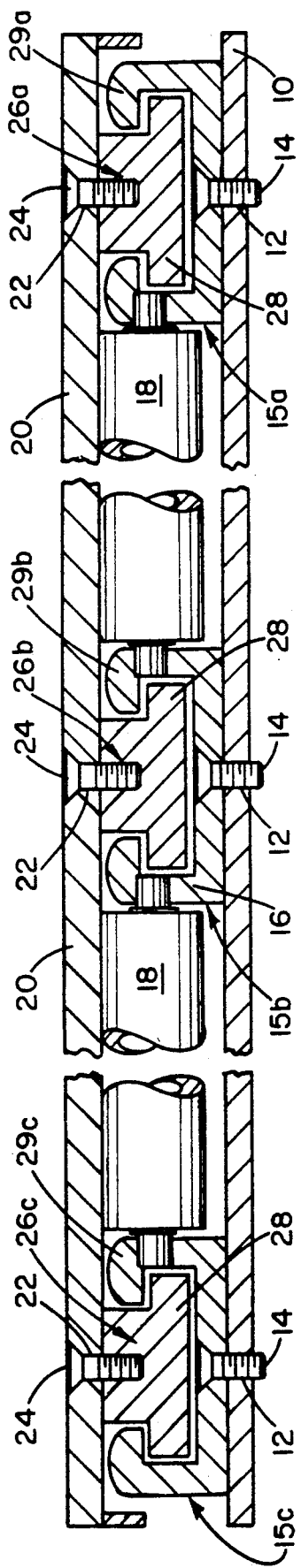
FIG. 2 is a cross-sectional front view of one embodiment of the invention.
Figure 4:
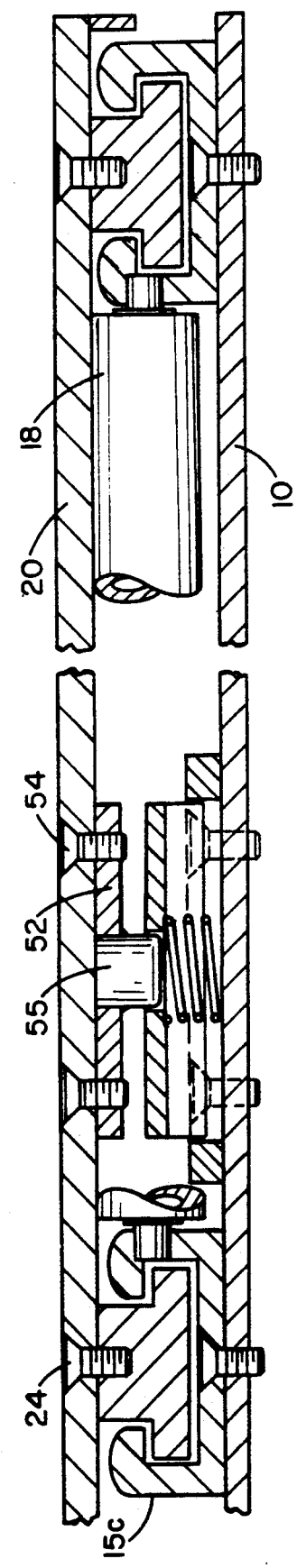
FIG. 4 is the front view showing the front latch of one embodiment of the invention.

FIGS. 1 through 10 illustrate several embodiments of the invention in which like parts are designated by like reference characters. As shown in FIG. 2 at 10 the bed of the pickup truck or a flat hard surface for the bed is shown which is usually made of steel, aluminum or like metals. In this floor or bed 10 of the pickup truck a plurality of openings 12 are provided which are adapted to receive countersunk mounting bolts 14 for mounting longitudinally extending C-shaped channels 15a, 15b, 15c parallel to each other upon the bed or floor of the truck. In FIG. 2 a sliding plate 20 is shown which, in a preferred embodiment, is also preferably constructed of steel, aluminum or like metal. The plate 20 is of substantially the length and width of the bed area carrying the longitudinally extending C-shaped channels. A series of spaced openings 22 are provided in the sliding plate 20 which are adapted to receive countersunk top mounting bolts 24. In the embodiment of FIG. 2 a set of inverted T-shaped blocks 26a, 26b, and 26c are mounted on the bolts 24 to provide means for movement of the plate 20 within the channels 15a, 15b and 15c, the channels providing a race way for the slidable plate. The T-shaped blocks are provided with laterally extending ears 28 on either side of the same, and the same are captured within the inwardly extending feet 29a, 29b, and 29c thereby preventing the T-shaped blocks 26 from moving upwardly or downwardly or from side to side of the channels and thus confining the sliding plate's movement to the lengthwise direction. As shown, the T-shaped blocks 26 are of a length approximately the same as the length of the sliding plate 20 and are slidable within grooves of raceway provided by the channels. The sliding plate 20 further rests on rollers 18 interposed between the C-shaped channels 16 and secured thereto which permits the sliding plate 20 to be easily moved inwardly and outwardly within or with portions thereof extended beyond the end of the truck.

Figure 3:
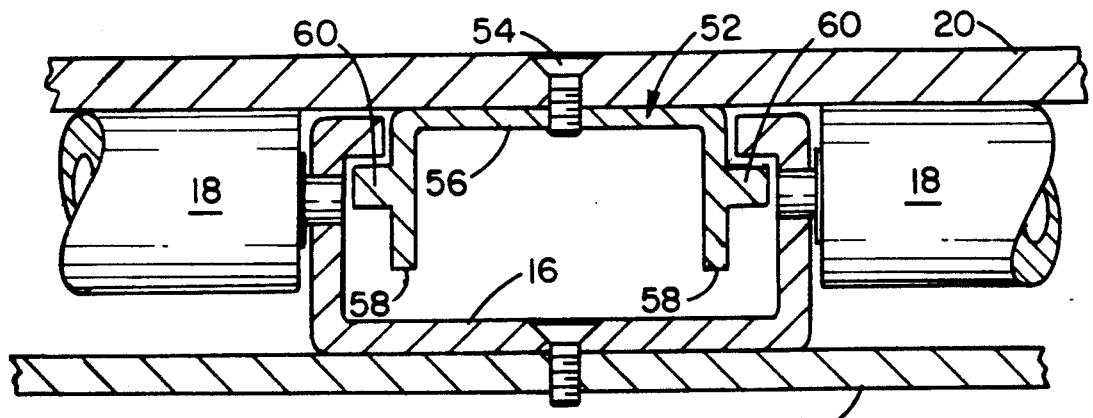
FIG. 3 is a cross-sectional front view of another embodiment of the invention.

FIG. 3 shows another embodiment of the invention in which the T-shaped blocks are replaced with an interlocking piece 52. This piece is basically formed by a flat cap plate 52 which is attached to sliding plate 20 by a mounting bolt 54. At the end of the cap plate are two end plates 58 that extend downwardly into the C-shaped channel. On each of these end plates is an ear 60 that extends outwardly and locks the interlocking piece 52 in the C-shaped channel 16 as shown in FIG. 3. In this second embodiment the interlocking pieces 52 are of a length of the sliding plate and the C-shaped channel and they are slidable within the grooves of the raceways of the C-shaped channels 16. As in the previous embodiment the sliding plate 20 further rests on rollers 18 interposed between the C-shaped channels 16 and secured thereto which permit the sliding plate 20 to be easily moved inwardly and outwardly within or with portion thereof extending beyond the end of the truck.

The floor can be easily installed by an amateur. Preferably openings 12 are drilled in the bottom of the pickup truck bed 10. The longitudinally extending C-shaped channels 15a, 15b, and 15c are placed on the bed 10 of the truck and openings in the channels aligned with openings 12 in the bottom 10 of the truck. The countersunk mounting bolts 14 are then threaded through the C-shaped channels 15 and the floor or bed 10 of the pickup truck. Thereafter, rollers 18 are mounted on the C-shaped channels 16. Bearings for said rollers preferably are threaded through openings 16 in the upstanding legs of the channels. The sliding plate 20 carrying the longitudinally extending T-shaped blocks 26 or the interlocking pieces 52 may already have been assembled at the factory by placing the T-shaped blocks 20 or the interlocking pieces 52 parallel to each other on the bottom of the sliding plate 20 and aligning the openings in the longitudinally extending T-shaped blocks or interlocking pieces 52 with the opening 22 of the sliding plate 20 and then inserting the countersunk top mounting bolts 24 or 54 through the sliding plate 20 and mounting the T-shaped blocks on 26 or interlocking pieces 52 on said sliding plate 20. One assembling the sliding floor on a pickup truck may then take the assembled sliding plate and blocks and slide the T-shaped blocks 26 or interlocking pieces 52 into the C-shaped channels 16 to assemble the sliding floor of the invention to the truck bed.

Figure 8:
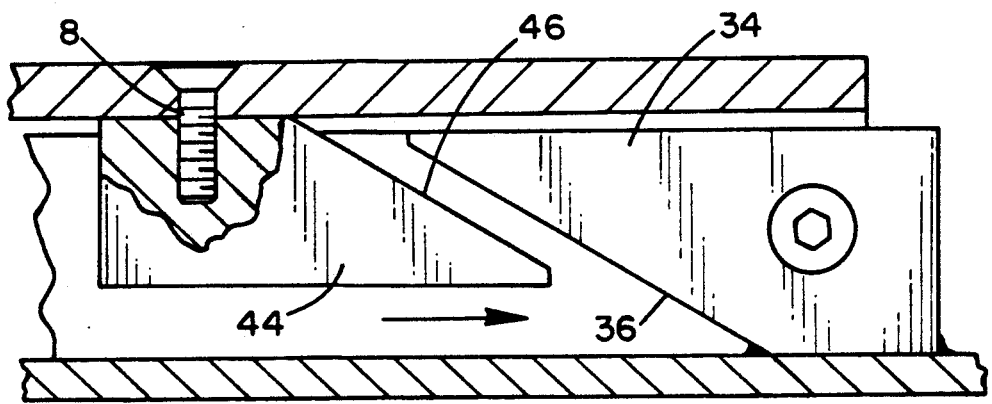
FIG. 8 is a cross-sectional side view of the back lock of the invention.

FIG. 1 illustrates a front latching device 40 and back locks 32 on the slidable floor and shows placement of back locks 32 at the rear end of the pickup truck bed and a front latch 40 at the front end of the pickup bed which is adapted to lock the sliding floor in a preferred adjustable lengthwise position beyond the rear of the truck bed. In FIG. 8 the back locks 32 are shown which comprise a stop 34 with a slanted edge 36. It will be noted that the said slanted edge 36 faces toward the front of the floor extension. On the sliding plate a second stop 44 is mounted on a countersunk bolt 8. In a preferred embodiment as shown in FIG. 8 the second block 44 also has a slanting edge 46 that slants toward the back of the slidable floor. The second stop 44 mounted on the sliding plate 20 is adapted so that when the sliding plate 20 is pushed back toward the rear of the floor extension the slanted edge 46 of the second stop 44 will meet the slanted edge 36 of the first stop 34 and the sliding plate 20 will not be able to move beyond that point. In FIG. 1 the back lock 32 is shown mounted at each back corner of the floor extension at the rear of the truck bed.

Figure 7:
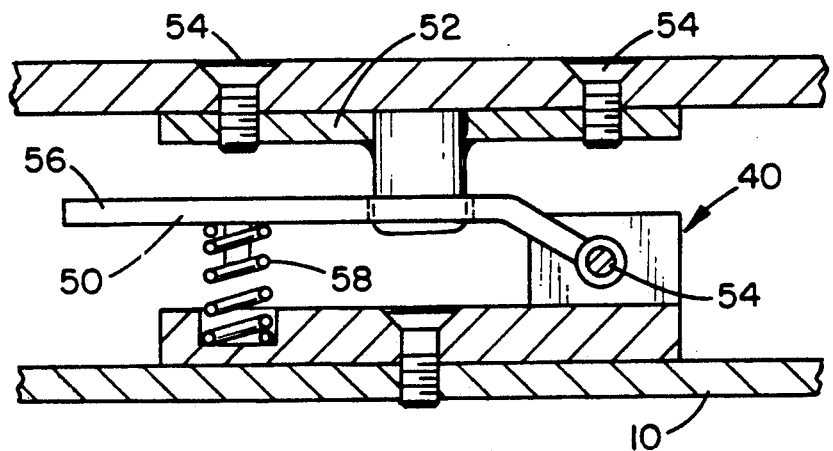
FIG. 7 is the side view of the front latch of FIG. 5.

In FIG. 1 the front latch 40 is mounted generally at the center of the front end of the floor extension or the back of the truck. In the preferred embodiment the front latch 40 is formed by a loop 50 that surrounds a peg 52 and said loop 50 keeps the peg 52 from moving forward. The peg 52 is attached to the bottom of the sliding plate 20. The loop 50 is attached to the floor of the truck 20 and in the preferred embodiment the loop 50 is made from a bar 54 to which a C-shaped metal piece 56 is attached. Said C-shaped metal piece 56 is attached such that it will be able to move vertically up and down. The bar 54 is then attached to the bottom of the truck bed 10. The C-shaped piece when in the up position, as shown in FIG. 7, keeps the peg 52 from moving forward. The C-shaped piece 56 is kept in the up position by a spring 58. When a person wishes to move the top plate 20 forward and extend the floor outwardly from the pickup, that person forces the C-shaped piece 56 down and thus allows the peg 52 to move forward past the C-shaped piece 56.

Figure 6:
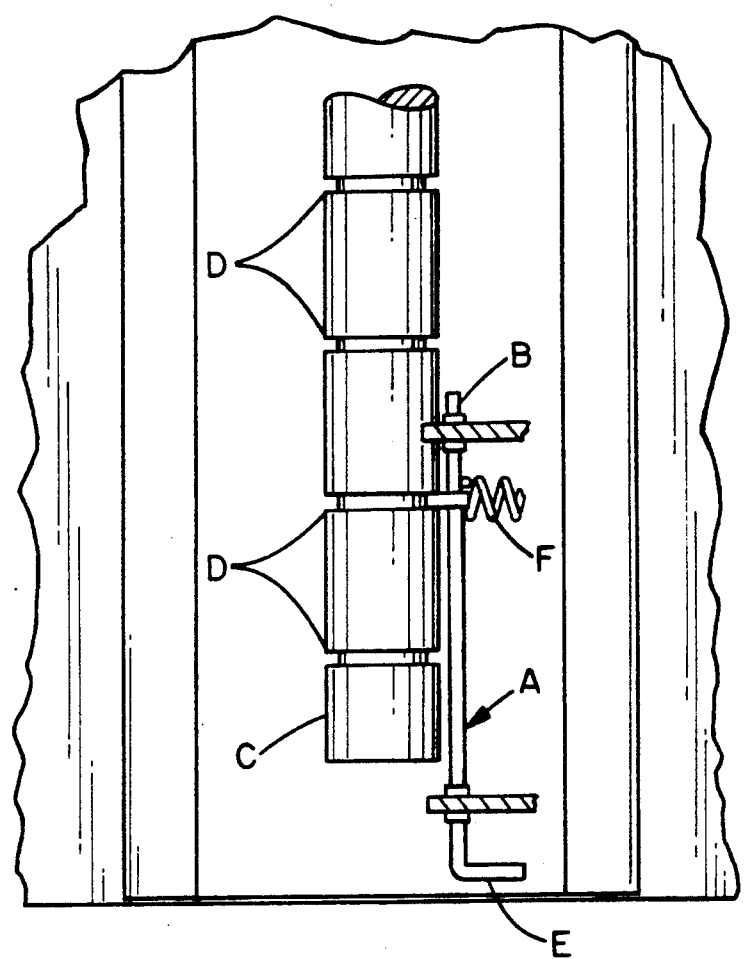
FIG. 6 is a perspective view showing the front latch of FIG. 5.
Figure 5:
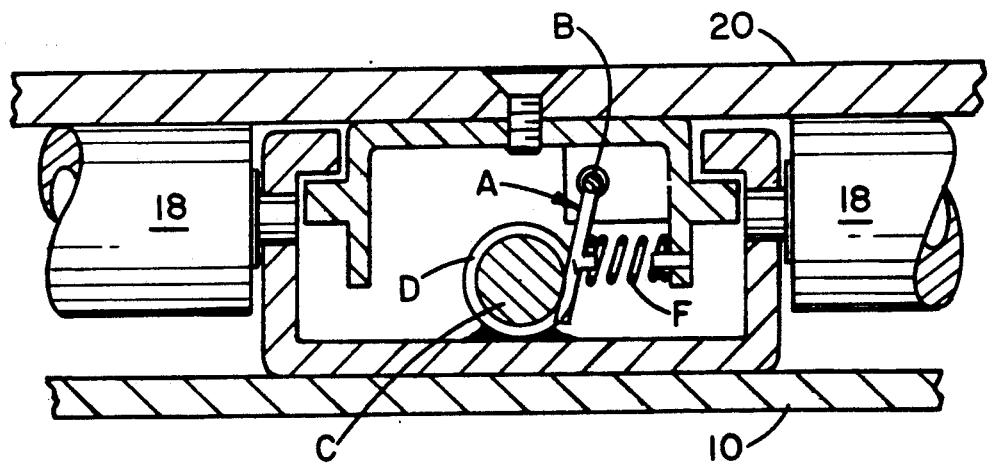
FIG. 5 is a front view showing the front latch of another embodiment of the invention.

In FIGS. 5 and 6 another embodiment is disclosed of a locking device to be employed with the sliding floor which not only locks the sliding plate in its wholly seated position on the bed or floor of the truck but is constructed in a manner whereby an individual can lock the sliding plate at different extended positions thereover. As shown a track C is provided on the truck bed or floor having notches D therein. A rod A having an arm B at one end and a handle E on the other end provides means whereby the rod is adapted to be seated in a selected notch D as shown in FIGS. 5 and 6. The handle E is used to seat or release the arm from a selected notch D to enable the plate 10 to be moved the desired extension by seating the same in another notch. The arm B which is adapted to be seated within a desired notch D in the track C is retained therein by spring means F, as shown in FIG. 5. Said locking means allows the sliding floor to be moved to different positions on the bed or floor of the truck and to be retained in a selected position.

The sliding floor of this invention may also be provided with means for supporting the sliding floor when a substantial portion of the same is disposed rearwardly of the end of the truck and a leg 70 is shown for said support means in FIG. 9. The leg 70 as shown is adjustable to different lengths wherefor the leg 70 which as shown is adapted to be carried under the sliding floor when the floor is extended beyond the rear end of the truck. When portions of the said floor are extended beyond the end of the truck the leg 70 may be dropped to engage ground or other underlying surface to provide support for the floor. In FIG. 9 a leg 70 is shown pivotally attached to the sliding floor 20. When portions of the floor are pulled out beyond the end of the truck the leg 70 is adapted to be pulled downwardly, as shown in FIG. 9 and locked into supporting position perpendicular to the plate.

Although the description above contains many specifics, these should not be constructed as limiting the scope of the invention but are merely provided to illustrate the preferred embodiments of this invention. Changes and modification of embodiment can be carried out without departing from the scope of the invention which is intended to be limited only by the scope of the appended claims.

What is claimed:

1. A sliding floor for a utility vehicle comprising:
   longitudinally extending C-shaped channels secured to the floor of a utility vehicle, said channels extending longitudinally and parallel to each other;
   a sliding plate having a back which rides above the C-shaped channels;
   interlocking means secured to the sliding plate adapted to ride within the C-shaped channels; and,
   rollers journaled at opposite ends to a respective one of said channels to produce a rolling surface over which the sliding plate travels.

2. A sliding floor for utility vehicles as in claim 1 further comprising a front latch that restrains the sliding plate in a selected forward position when locked.

3. A sliding floor for utility vehicles as in claim 1 further comprising a lock placed at the back of the sliding plate to restrain the sliding plate from moving beyond a selected position at the rear.

4. A sliding floor for a utility vehicle as in claim 1 further comprising a lock that allows the sliding plate to be locked in several extended positions.

5. A sliding floor for a utility vehicle as in claim 1 comprising a means for adding support when the sliding plate is in an extended position, said means being secured to the sliding plate.

6. A sliding floor for a utility vehicle as in claim 1 further comprising a leg secured to the sliding plate which leg is carried beneath the sliding plate when the sliding plate is disposed over the floor of the vehicle and when the sliding plate is extended to a position beyond the end of the vehicle the leg provides support for the extended sliding plate.

7. A sliding floor for a utility vehicle as in claim 1 further comprising a foldable leg secured to the sliding plate which leg is folded beneath the sliding plate when the sliding plate is disposed over the floor of the vehicle and when the sliding plate is extended beyond the end of the vehicle said leg can fold out and provide support for the extended sliding plate.

8. A sliding floor for a utility vehicle as in claim 6 wherein the leg is adjustable to different heights.

9. A slidable floor as in claim 1 wherein the means for interlocking is a T-shaped block attached to the sliding plate and said block is adapted to ride within the C-shaped channels.

10. A slidable floor for utility vehicle as in claim 1 wherein the means for interlocking comprises a flat cap plate attached to the sliding plate and having end plates attached thereto which extend downwardly, each of said end plates having an ear extending outwardly therefrom, said interlocking means being adapted to ride within the C-shaped channels.

* * * * *